(12) United States Patent
Liu et al.

(10) Patent No.: US 10,752,811 B2
(45) Date of Patent: *Aug. 25, 2020

(54) POLYESTER COMPOSITIONS

(71) Applicant: 3M INNOVATIVE PROPERTIES COMPANY, St. Paul, MN (US)

(72) Inventors: Richard Y. Liu, Woodbury, MN (US); Victor Ho, St. Paul, MN (US); Jun Ma, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/748,219

(22) PCT Filed: Aug. 11, 2016

(86) PCT No.: PCT/US2016/046450
§ 371 (c)(1),
(2) Date: Jan. 29, 2018

(87) PCT Pub. No.: WO2017/030877
PCT Pub. Date: Feb. 23, 2017

(65) Prior Publication Data
US 2018/0215959 A1 Aug. 2, 2018

Related U.S. Application Data

(60) Provisional application No. 62/206,618, filed on Aug. 18, 2015.

(51) Int. Cl.
| | | |
|---|---|---|
| *C08G 63/00* | (2006.01) | |
| *C09J 7/38* | (2018.01) | |
| *C09J 11/06* | (2006.01) | |
| *C08G 83/00* | (2006.01) | |
| *C08G 63/54* | (2006.01) | |
| *C09J 167/06* | (2006.01) | |
| *C08K 5/00* | (2006.01) | |
| *C09J 167/02* | (2006.01) | |
| *C09J 167/07* | (2006.01) | |
| *G01N 25/48* | (2006.01) | |

(52) U.S. Cl.
CPC ............... *C09J 7/38* (2018.01); *C08G 63/54* (2013.01); *C08G 83/00* (2013.01); *C08K 5/0025* (2013.01); *C09J 11/06* (2013.01); *C09J 167/02* (2013.01); *C09J 167/06* (2013.01); *C09J 167/07* (2013.01); *G01N 25/4866* (2013.01)

(58) Field of Classification Search
USPC .................................................. 528/271, 272
See application file for complete search history.

(56) References Cited

U.S. PATENT DOCUMENTS

| | | |
|---|---|---|
| 3,658,670 A | 4/1972 | Holicky et al. |
| 3,804,921 A | 4/1974 | Jamison |
| 3,932,326 A | 1/1976 | Hoh et al. |
| 4,028,305 A | 6/1977 | Li et al. |
| 4,091,141 A | 5/1978 | Harris |
| 4,122,073 A | 10/1978 | Georgoudis |
| 4,124,571 A | 11/1978 | Georgoudis |
| 4,477,636 A | 10/1984 | Muroi |
| 4,745,141 A | 5/1988 | Akiyama |
| 4,820,745 A | 4/1989 | Müller et al. |
| 4,822,829 A | 4/1989 | Müller et al. |
| 4,873,023 A | 10/1989 | Schulz et al. |
| 5,278,199 A | 1/1994 | Ohkawa |
| 5,371,112 A | 12/1994 | Sayre et al. |
| 5,380,775 A | 1/1995 | Cowley |
| 5,656,681 A | 8/1997 | Shimizu et al. |
| 5,674,623 A | 10/1997 | Haddon et al. |
| 5,879,759 A | 3/1999 | Zang |
| 5,900,473 A | 5/1999 | Acevedo et al. |
| 6,342,122 B1 | 1/2002 | Riley et al. |
| 6,645,617 B1 | 11/2003 | Okazaki et al. |
| 8,962,136 B2 | 2/2015 | Takahira |
| 8,999,503 B2 | 4/2015 | Takahira |
| 2003/0069323 A1 | 4/2003 | Varlemann et al. |
| 2003/0232222 A1 | 12/2003 | Anderson |
| 2004/0039136 A1 | 2/2004 | Godi et al. |
| 2004/0072964 A1 | 4/2004 | Udding et al. |
| 2004/0087714 A1 | 5/2004 | Baumgart |
| 2005/0025903 A1 | 2/2005 | Fink et al. |
| 2006/0047140 A1 | 3/2006 | Hayakawa et al. |
| 2007/0010651 A1 | 1/2007 | Finch et al. |
| 2007/0027269 A1 | 2/2007 | Stumbe et al. |
| 2010/0184880 A1 | 7/2010 | Fukui |
| 2010/0255239 A1 | 10/2010 | Hammond et al. |

(Continued)

FOREIGN PATENT DOCUMENTS

| | | |
|---|---|---|
| CN | 1430657 | 7/2003 |
| DE | 1595851 | 9/1969 |

(Continued)

OTHER PUBLICATIONS

International Search Report for PCT International Application No. PCT/US2016/046450, dated Oct. 27, 2016, 3pgs.
Cheng, "Popularization book on Modern Petroleum and Petrochemical Industry Technology: Synthetic Rubber", China Petrochemical Press, Oct. 2000, pp. 85.
Handbook of Polyurethane Elastomers, Chemical Industry Press of China, Jan. 2001, pp. 359.

*Primary Examiner* — Terressa Boykin
(74) *Attorney, Agent, or Firm* — Clifton F. Richardson

(57) ABSTRACT

A polyester including at least one crosslinkable moiety is described. Each crosslinkable moiety includes at least one crosslinkable pendent group. A ratio of a total number of the at least one crosslinkable pendent groups to a total number of ester groups in the polyester may be in a range of 0.0001 to 0.5.

20 Claims, 1 Drawing Sheet

(56) References Cited

U.S. PATENT DOCUMENTS

| | | |
|---|---|---|
| 2011/0257273 A1 | 10/2011 | Yabuuchi et al. |
| 2012/0208016 A1 | 8/2012 | Takahira |
| 2012/0208017 A1 | 8/2012 | Yoshie |
| 2014/0107246 A1 | 4/2014 | Bigwood et al. |
| 2015/0184040 A1 | 7/2015 | Tian et al. |
| 2016/0312073 A1 | 10/2016 | Yoshida et al. |
| 2018/0215970 A1 | 8/2018 | Liu et al. |
| 2018/0237585 A1 | 8/2018 | Liu et al. |

FOREIGN PATENT DOCUMENTS

| | | |
|---|---|---|
| EP | 2325228 | 5/2011 |
| EP | 2583824 | 4/2013 |
| JP | 2003-268052 | 9/2003 |
| JP | 2007-099879 | 4/2007 |
| TW | 201202361 | 1/2012 |
| WO | WO 2015-093526 | 6/2015 |

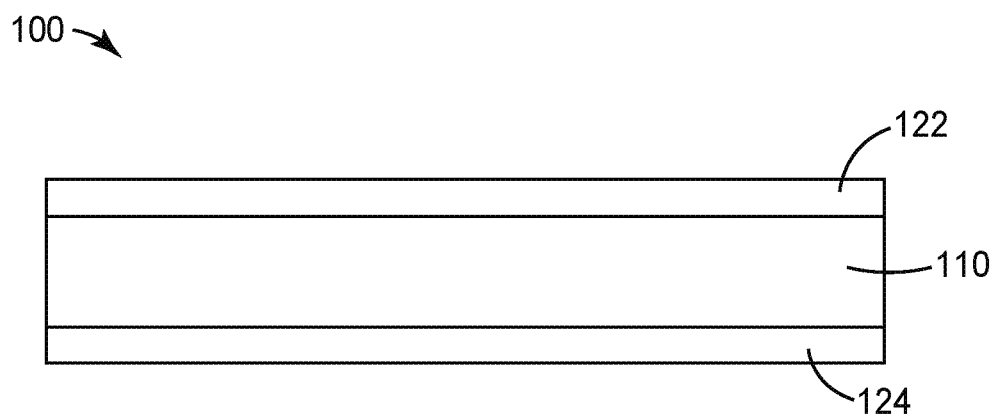

POLYESTER COMPOSITIONS

BACKGROUND

Pressure sensitive adhesives may include polyester groups. The pressure sensitive adhesives may be crosslinked in solution phase using a multifunctional isocyanate crosslinker.

SUMMARY

In some aspects of the present description, a polyester including at least one crosslinkable moiety is provided. Each crosslinkable moiety includes at least one crosslinkable pendent group. A ratio of a total number of the at least one crosslinkable pendent groups to a total number of ester groups in the polyester is in a range of 0.0001 to 0.5.

In some aspects of the present description, a polyester including at least one crosslinkable moiety is provided. Each crosslinkable moiety includes at least one crosslinkable pendent group. A ratio of a total number of the at least one crosslinkable moiety to a total number of ester groups in the polyester is in a range of 0.0001 to 0.5.

In some aspects of the present description, a polyester comprising the reaction product of reactive precursors is provided. The reactive precursors include at least one diacid or diester, at least one diol not containing a crosslinkable pendent group, and at least one monomer containing at least one crosslinkable pendent group. A ratio of the number of molecules of the at least one monomer to a sum of the number of molecules of the at least one diacid or diester and the number of molecules at least one diol is in a range of 0.0001 to 0.5.

BRIEF DESCRIPTION OF THE DRAWING

FIG. 1 is a schematic cross-sectional view of a tape.

DETAILED DESCRIPTION

Polyesters may be formed as the reaction product of diacids and diols. For example, terephthalic acid (a diacid) and ethylene glycol (a diol) can be reacted to form polyethylene terephthalate (PET). Polyester can be chain-extended or cross-linked in a solution phase reaction by utilizing a di-functional or a multifunctional isocyanate as a chain extending or crosslinking agent. In some cases, the resulting chain-extended or cross-linked polyester compositions can be used as adhesives but such adhesives typically exhibit poor shear strength.

According to the present description, polyester compositions that offer improved performance as adhesives have been discovered. The polyesters include one or more moieties which are crosslinkable by virtue of having crosslinkable pendent groups. The crosslinkable pendent groups may include one or more reactive unsaturated carbon-carbon bonds, e.g., alkene or alkyne, which could undergo efficient radical-based addition or propagation reactions. In some embodiments, the crosslinkable pendent group includes terminal alkene, substituted alkene, allyl, alkyne, cyclic alkene, (meth)acrylate or other reactive groups. In some embodiments, the crosslinkable pendent groups include a carbon-carbon double bond (—C═C—). The polyesters may be crosslinkable by the application of actinic radiation (e.g., ultraviolet radiation or electron beam radiation) and/or may be crosslinkable by the application of heat (thermal-induced crosslinking). The polyesters of the present description offer advantages over other polyester containing adhesives. For example, the polyesters can be crosslinked with high efficiency and without low molecular weight monomer additives.

In some embodiments, a ratio of a total number of the at least one crosslinkable pendent groups in the polyester to a total number of ester groups in the polyester is in a range of 0.0001 to 0.5, or in a range of 0.001 to 0.2, or in a range of 0.001 to 0.1. In some embodiments, a ratio of a total number of the at least one crosslinkable moiety to a total number of ester groups in the polyester is in a range of 0.0001 to 0.5, or in a range of 0.001 to 0.2, or in a range of 0.001 to 0.1.

In some embodiments, the polyester is made by reacting precursors that include at least one diacid, at least one diol not containing a crosslinkable pendent group, and at least one monomer containing a crosslinkable pendent group. In some embodiments, the at least one diacid includes at least two diacids and in some embodiments, the at least one diol not containing a crosslinkable pendent group includes at least two diols. A pendent group may refer to a side group attached to a backbone chain of a polymer. A monomer may be said to contain a pendent group if it contains a group which becomes a side group upon polymerization. A ratio of the number of molecules of the at least one monomer to a sum of the number of molecules of the at least one diacid and the number of molecules at least one diol is in a range of 0.0001 to 0.5, or in a range of 0.001 to 0.2, or in a range of 0.001 to 0.1. In some embodiments, a ratio of the number of molecules of the at least one diacid to the number of molecules of the at least one diol is in a range of 0.85 to 1.15, or 0.9 to 1.1. In some embodiments, the at least one monomer containing a crosslinkable pendent group may be an alkene- or alkyne-containing diacid or diol or diester. It will be understood that the polyesters of the present description can be alternatively made by substituting diesters for diacids in the reactive precursors.

Each moiety containing a crosslinkable pendent group may include a carbon-carbon double bond and in some embodiments may be represented by the general Formula 1 below:

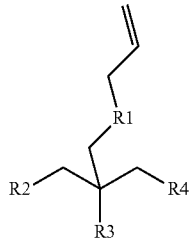

Formula 1 where
R1 is —O—, —(CH2)n-, —COO—, —OCO—, —OOC—, —S—, —(C═O)— or their combinations;
R2 is —OH, —COOH or —R2'-, wherein —R2'- is —O—, —COO—, —(CH2)n-, —(C═O)—, —S—, or combinations thereof; R3 is —H, —CH3, —OH, —CH2OH, —(CH2)m-CH3, —SO3Na, —COONa, or combinations thereof; and
R4 is —O—, —COO—, —(CH2)p-, —(C═O)—, —S— or combinations thereof.

Here, n, m and p are integers greater than 0. For example, n, m and p may each be independently in the range of 1 to 100. In some embodiments, an end group of the polyester may comprise the moiety (e.g., R2 may be —COOH, or —OH). In some embodiments the moiety may be represented by the Formula 2 below:

Formula 2

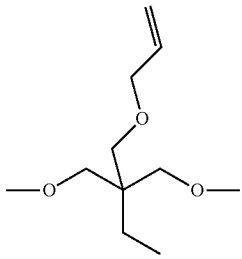

In some embodiments, the polyester may be made by reacting precursors that include at least one diacid, at least one diol not containing a crosslinkable pendent group, and a monomer which forms the moiety. In some embodiments, the monomer may be selected to give a moiety represented by the general Formula 1 above. In some embodiments, the monomer is trimethylolpropane monoallyl ether (TMPME) which can form the moiety represented by Formula 2. In other exemplary embodiments, monomers represented by any of Formulas 3 to 5 may be chosen.

Formula 3

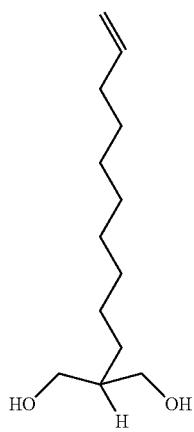

Formula 4

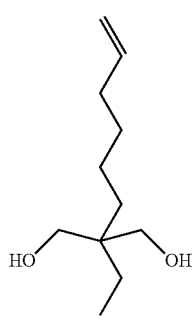

Formula 5

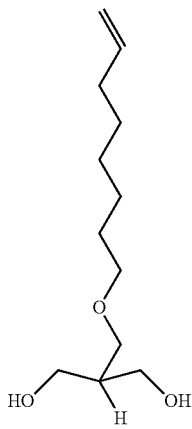

In still other embodiments, monomers represented by any of the Formulas 3 to 5 with the —OH groups replaced by —COOH groups (or alternatively by ester groups) may be used. In some embodiments, the pendent groups of the moiety generating monomer have at least 3 functionalities, among which 2 of them are either —OH or —COOH terminated while the third one is neither —OH nor —COOH. The third pendent functional group may be terminated by a —C═C bond. Other suitable possibilities are provided in Formula 1. Further possibilities for the crosslinkable pendent groups are provided in Formulas 6 to 9 where R represents a constituent of the backbone of the polyester.

Formula 6

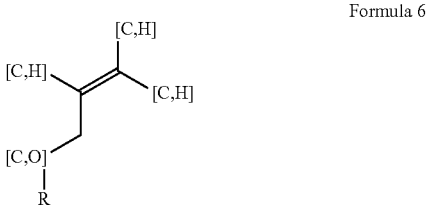

Formula 7

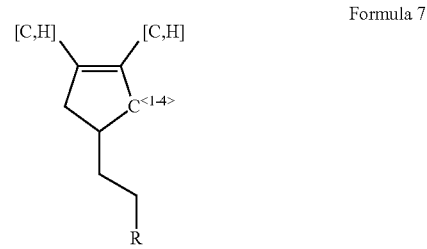

Formula 8

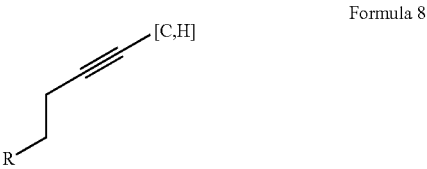

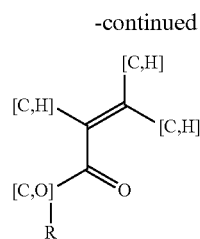

Formula 9

In some embodiments, the polyesters are formed by reacting precursors (e.g., in an esterification reaction) that include at least one acid (e.g., a diacid such as a dicarboxylic acid or a polyacid such as a polycarboxylic acid), at least one alcohol (e.g., a diol or a polyol), and at least one monomer containing at least one crosslinkable pendent group. Examples of suitable acids include terephthalic acid (e.g., 1,4 terephthalic acid), 1,4 naphthalic acid, isophthalic acid, phthalic acid, 2,6-naphthalenedicarboxylic acid, diphenyl-dicarboxylic acid, succinic acid, adipic acid, azelaic acid, sebacic acid, dodecanedionic acid, 1,4-cyclohexanedicarboxylic acid, and combinations thereof. Examples of suitable alcohols include ethylene glycol, diethylene glycol, triethylene glycol, polyethylene glycol, propylene glycol, dipropylene glycol, polypropylene glycol, 1,3-butanediol, 1,4-butanediol, 1,6-hexane diol, neopentyl glycol, and combinations thereof. Suitable monomers containing at least one crosslinkable pendent group include those selected to give a moiety represented by the general Formula 1 above. In some embodiments, the at least one monomer containing at least one crosslinkable pendent group may be a diol monomer, a diacid monomer, or a combination thereof.

In some embodiments, the polyesters are formed by reacting precursors that include at least one diacid, at least one diol, and at least one monomer containing a crosslinkable pendent group. The reaction between the diols, the diacids and the monomers containing the pendent group may be catalyzed by tetrabutyl titanate, cobalt acetate, zinc acetate, antimony triacetate, and/or other metal acetates. Stabilizers such as triethyl phosphonoacetate may be included to stabilize the catalyst after the reaction. Branching agents such as trimethylol propane may also be used in the reaction.

The polyester composition may be an adhesive, and may be a pressure sensitive adhesive, without crosslinking the polyester composition. However, the properties of the adhesive (e.g., modulus, bond strength, etc.) may be improved by crosslinking (curing) the polyester, which can be done by applying actinic radiation. The adhesive may have adequate adhesion properties without the addition of a plasticizer to the composition, but a plasticizer may optionally be included. The adhesive may have adequate adhesion properties without the addition of a tackifier to the composition, but a tackifier may optionally be included.

In some embodiments, the polyesters have a glass transition temperature (Tg) determined by differential scanning calorimetry (DSC) less than 0° C., or less than −10° C., or less than −20° C.

In some embodiments, the polyesters prior to curing (crosslinking) have a shear modulus at 1 Hz and 23° C. that is less than 1 MPa, or less than 0.5 MPa, or less than 0.3 MPa. The shear modulus refers to the real part of the complex shear modulus, which may be denoted G' (G prime) based on Dynamic Mechanical Analysis (DMA), unless specified differently. A tan delta value may also be determined by DMA. Unless specified differently, tan delta values specified herein refer to the tan delta value determined by DMA.

In some embodiments, the polyesters have a weight-averaged molecular weight (Mw) of at least 60,000 g/mol, or at least 80,000 g/mol, or at least 100,000 g/mol. The weight-averaged molecular weight (Mw) refers the Mw value determined using gel permeation chromatography (GPC) unless specified differently.

The crystallinity of the polyesters can be determined using differential scanning calorimetry (DSC). In some embodiments, the polyesters have a crystallinity corresponding to a melting endotherm of less than 20 J/g, or less than 10 J/g, or less than 5 J/g, or substantially zero. The crystallinity may be said to be substantially zero if a statistically meaningful non-zero value of the melting endotherm cannot be measured using standard DSC techniques. In some embodiments, the polyester will not crystalize and so the polyester does not have a melting point.

In some embodiments, the polyesters after curing (e.g., crosslinking via applying actinic radiation) have a shear modulus at 1 Hz and 23° C. that is less than 300,000 Pa, or less than 200,000 Pa. In some embodiments, the polyesters after curing have a shear modulus at 1 Hz and 70° C. that is at least 20,000 Pa. In some embodiments, the polyesters after curing have a shear modulus at 1 Hz and 100° C. that is at least 10,000 Pa In some embodiments, the polyesters after curing have a shear modulus at 1 Hz and 130° C. that is at least 10,000 Pa.

In some embodiments, the polyesters have a tan delta as determined by DMA that is less than 0.7 at 23° C. after curing. In some embodiments, the polyesters have a tan delta less than 0.8 at 70° C. after curing, based on DMA. In some embodiments, the polyesters have a tan delta less than 0.8 at 100° C. after curing, based on DMA. In some embodiments, the polyesters have a tan delta less than 0.8 at 130° C. after curing, based on DMA.

In some embodiments, a tape that includes the polyester is provided. The polyester may be included in an adhesive layer in any type of tape. In some embodiments, the tape is a transfer tape as schematically illustrated in FIG. 1. Tape 100 includes polyester 110, which may or may not be crosslinked, disposed between first and second release films 122 and 124. Polyester 110 may be an adhesive which may be a pressure sensitive adhesive.

EXAMPLES

Example 1

A polyester composition was synthesized in a 8000 cubic centimeter reactor with the following raw material charge: ethylene glycol (24 parts by mole), 1,6-hexane diol (25 parts by mole), 1,4-cyclohexanedimethanol (25 parts by mole), neopentyl glycol (25 parts by mole), trimethylolpropane monoallyl ether (1 parts by mole), sebacic acid (70 parts by mole), isophthalic acid (30 parts by mole), tetrabutyl titanate (450 ppm by total polymer weight), and triethylphosphono-acetate (450 ppm by total polymer weight). The mixture was heated to a temperature of 248° C. at a pressure of two atmospheres (270 kPa) and the mixture allowed to react while removing the water by product. After completing the reaction and removing water, the pressure was reduced to 0.5 to 5 mmHg range while heating to 271° C. The condensation by-product, ethylene glycol, was continuously removed until a polymer of viscous nature was produced.

The Mw of the resulting polyester determined by GPC was 254,000 g/mol. The Tg determined by DSC was −37° C.

Example 2

A polyester composition was synthesized as in Example 1, except that in the raw material charge, the concentration of ethylene glycol was reduced to 23 parts by mole and the concentration of trimethylolpropane monoallyl ether was increased to 2 parts by mole. The Mw of the resulting polyester determined by GPC was 291,000 g/mol. The Tg determined by DSC was −37° C.

Example 3

A polyester composition was synthesized as in Example 1, except that in the raw material charge, the concentration of ethylene glycol was reduced to 21 parts by mole and the concentration of trimethylolpropane monoallyl ether was increased to 4 parts by mole. The Mw of the resulting polyester determined by GPC was 365,000 g/mol. The Tg determined by DSC was −37° C.

Example 4

A polyester composition was synthesized as in Example 1, except that in the raw material charge, the concentration of ethylene glycol was reduced to 17 parts by mole and the concentration of trimethylolpropane monoallyl ether was increased to 8 parts by mole. The Mw of the resulting polyester determined by GPC was 384,000 g/mol. The Tg determined by DSC was −38° C.

The properties of the polyesters of Examples 1 to 4 are summarized in Table 1.

TABLE 1

| Example | Tg (° C.) | Tm | ΔHm (J/g) | Mw (Kg/mol) |
|---|---|---|---|---|
| 1 | −37 | none | 0 | 254 |
| 2 | −37 | none | 0 | 291 |
| 3 | −37 | none | 0 | 365 |
| 4 | −38 | none | 0 | 384 |

Example 5-8

For Examples 5-8, the polyester compositions of Examples 1 through 4, respectively, were extruded at 50 micrometer thickness into an adhesive transfer tape between two release liners using a twin screw extruder at 176° C. The resulting tapes were then cured by radiating the tapes using electron beam at a 5 Mrad dose. All of the resulting tapes formed substantially insoluble gels and remained tacky. Dynamic Mechanical Analysis (DMA) at 1 Hz was carried out to determine G' and tan delta of the polyesters before and after curing. The results for G' are summarized in the Table 2 and the results for tan delta are summarized in Table 3.

TABLE 2

| | Before Curing | | | | After Curing | | | |
|---|---|---|---|---|---|---|---|---|
| Example | G' (Pa) (23° C.) | G' (Pa) (70° C.) | G' (Pa) (100° C.) | G' (Pa) (130° C.) | G' (Pa) (23° C.) | G' (Pa) (70° C.) | G' (Pa) (100° C.) | G' (Pa) (130° C.) |
| 5 | 106044 | 18006 | 7056 | 3241 | 159871 | 35087 | 18716 | 11637 |
| 6 | 107338 | 20772 | 9238 | 4615 | 96594 | 27497 | 17804 | 14439 |
| 7 | 56164 | 10304 | 4727 | 3319 | 102204 | 34218 | 24625 | 20290 |
| 8 | 64885 | 10609 | 4826 | 2569 | 84231 | 28330 | 20711 | 16881 |

TABLE 3

| | Before Curing | | | | After Curing | | | |
|---|---|---|---|---|---|---|---|---|
| Example | Tan delta (23° C.) | Tan delta (70° C.) | Tan delta (100° C.) | Tan delta (130° C.) | Tan delta (23° C.) | Tan delta (70° C.) | Tan delta (100° C.) | Tan delta (130° C.) |
| 5 | 0.733 | 1.00 | 1.22 | 1.44 | 0.626 | 0.701 | 0.730 | 0.740 |
| 6 | 0.706 | 0.905 | 1.04 | 1.18 | 0.571 | 0.555 | 0.522 | 0.485 |
| 7 | 0.630 | 0.86 | 0.983 | 1.06 | 0.5337 | 0.462 | 0.403 | 0.346 |
| 8 | 0.730 | 0.920 | 1.02 | 1.08 | 0.551 | 0.462 | 0.424 | 0.409 |

The following is a list of exemplary embodiments of the present description.

Embodiment 1 is a polyester comprising at least one crosslinkable moiety, each crosslinkable moiety including at least one crosslinkable pendent group, wherein a ratio of a total number of the at least one crosslinkable pendent groups to a total number of ester groups in the polyester is in a range of 0.0001 to 0.5.

Embodiment 2 is the polyester of embodiment 1, wherein the ratio of the total number of the at least one crosslinkable pendent groups to the total number of ester groups in the polyester is in a range of 0.001 to 0.1.

Embodiment 3 is a polyester comprising at least one crosslinkable moiety, each crosslinkable moiety including at least one crosslinkable pendent group, wherein a ratio of a total number of the at least one crosslinkable moiety to a total number of ester groups in the polyester is in a range of 0.0001 to 0.5.

Embodiment 4 is the polyester of embodiment 3, wherein the ratio of the total number of the at least one crosslinkable moiety to the total number of ester groups in the polyester is in a range of 0.001 to 0.1.

Embodiment 5 is a polyester comprising the reaction product of reactive precursors, the reactive precursors comprising:
  at least one diacid or diester;
  at least one diol not containing a crosslinkable pendent group; and
  at least one monomer containing at least one crosslinkable pendent group;
  wherein a ratio of the number of molecules of the at least one monomer to a sum of the number of molecules of the at least one diacid or diester and the number of molecules at least one diol is in a range of 0.0001 to 0.5.

Embodiment 6 is the polyester of embodiment 5, wherein the ratio of the number of molecules of the at least one monomer to the sum of the number of molecules of the at least one diacid or diester and the number of molecules at least one diol is in a range of 0.001 to 0.1.

Embodiment 7 is the polyester of embodiment 5, wherein a ratio of the number of molecules of the at least one diacid or diester to the number of molecules of the at least one diol is in a range of 0.85 to 1.15.

Embodiment 8 is the polyester of embodiment 5, wherein a ratio of the number of molecules of the at least one diacid or diester to the number of molecules of the at least one diol is in a range of 0.9 and 1.1.

Embodiment 9 is the polyester of any of embodiments 1 to 8, wherein the at least one crosslinkable pendent group comprises a carbon-carbon double bond.

Embodiment 10 is the polyester of any of embodiments 1 to 4, wherein the at least one crosslinkable moiety includes a moiety arising from a reacted diol monomer, a moiety arising from a reacted diacid monomer, a moiety arising from a reacted diester monomer, or a combination thereof.

Embodiment 11 is the polyester of any of embodiments 5 to 8, wherein the at least one monomer containing the crosslinkable pendent group comprises a diol monomer, a diacid monomer, a diester monomer, or a combination thereof.

Embodiment 12 is the polyester of any of embodiments 1 to 4, wherein each moiety has the formula:

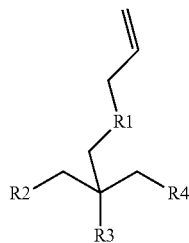

wherein R1 is —O—, —(CH2)n-, —COO—, —OCO—, —OOC—, —S—, or —(C═O)—;
  R2 is —OH, —COOH, or —R2'-, wherein —R2'- is —O—, —COO—, —(CH2)n-, —(C═O)—, or —S—;
  R3 is —H, —CH3, —OH, —CH2OH, —(CH2)m-CH3, —SO3Na, or —COONa;
  R4 is —O—, —COO—, —(CH2)p-, —(C═O)—, or —S—;
  and n, m and p are a positive integers.

Embodiment 13 is the polyester of embodiment 12, wherein n, m and p are independently in a range of 1 to 100.

Embodiment 14 is the polyester of embodiment 12, wherein the moiety has the formula:

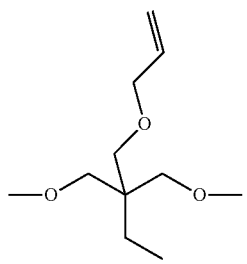

Embodiment 15 is the polyester of any of embodiments 5 to 8, wherein the at least one monomer comprises trimethylpropane monoallyl ether.

Embodiment 16 is the polyester of any of embodiments 1 to 15 being an adhesive.

Embodiment 17 is the polyester of any of embodiments 1 to 16 being a pressure sensitive adhesive.

Embodiment 18 is the polyester of any of embodiments 1 to 17 having a glass transition temperature less than 0° C.

Embodiment 19 is the polyester of embodiment 18, wherein the glass transition temperature is less than −10° C.

Embodiment 20 is the polyester of embodiment 18, wherein the glass transition temperature is less than −20° C.

Embodiment 21 is the polyester of any of embodiments 1 to 20 having a shear modulus at 1 Hz and 23° C. less than 1 MPa.

Embodiment 22 is the polyester of any of embodiments 1 to 21 having a weight-averaged molecular weight of at least 60 Kg/mol.

Embodiment 23 is the polyester of embodiment 22, wherein the weight-averaged molecular weight is at least 80 Kg/mol.

Embodiment 24 is the polyester of embodiment 22, wherein the weight-averaged molecular weight is at least 100 Kg/mol.

Embodiment 25 is the polyester of any of embodiments 1 to 24 having a crystallinity corresponding to a DSC melting endotherm of less than 20 J/g.

Embodiment 26 is the polyester of embodiment 25, wherein the crystallinity corresponds to a DSC melting endotherm of less than 10 J/g.

Embodiment 27 is the polyester of embodiment 25, wherein the crystallinity corresponds to a DSC melting endotherm of less than 5 J/g.

Embodiment 28 is the polyester of embodiment 25, wherein the crystallinity is substantially zero.

Embodiment 29 is the polyester of any of embodiments 1 to 28, wherein the polyester does not have a melting point.

Embodiment 30 is the polyester of any of embodiments 1 to 29, wherein the polyester is capable of being cross-linked by the application of radiation or heat.

Embodiment 31 is the polyester of any of embodiment 1 to embodiment 30, wherein the polyester is capable of being cross-linked by the application of actinic radiation.

Embodiment 32 is a cured polyester comprising the polyester of any of embodiments 1 to 31 cured by the application of radiation or heat.

Embodiment 33 is the cured polyester of embodiment 32 having a shear modulus at 1 Hz and 23° C. of less than 300,000 Pa.

Embodiment 34 is the cured polyester of embodiment 32 or 33, wherein the shear modulus at 1 Hz and 23° C. is less than 200,000 Pa.

Embodiment 35 is the cured polyester of any of embodiments 32 to 34 having a shear modulus at 1 Hz and 70° C. of at least 10,000 Pa.

Embodiment 36 is the cured polyester of any of embodiments 32 to 35 having a shear modulus at 1 Hz and 100° C. of at least 20,000 Pa.

Embodiment 37 is the cured polyester of any of embodiments 32 to 36 having a shear modulus at 1 Hz and 130° C. of at least 10,000 Pa.

Embodiment 38 is the cured polyester of any of embodiments 32 to 37 having a tan delta at 23° C. and 1 Hz of less than 0.7.

Embodiment 39 is the cured polyester of any of embodiments 32 to 38 having a tan delta at 70° C. and 1 Hz of less than 0.8.

Embodiment 40 is the cured polyester of any of embodiments 32 to 39 having a tan delta at 100° C. and 1 Hz of less than 0.8.

Embodiment 41 is the cured polyester of any of embodiments 32 to 40 having a tan delta at 130° C. and 1 Hz of less than 0.8.

Embodiment 42 is a pressure sensitive adhesive comprising the cured polyester of any of embodiments 32 to 41.

Embodiment 43 is a tape comprising the polyester of any of embodiments 1 to 31 or the cured polyester of any of embodiments 32 to 41 or the pressure sensitive adhesive of embodiment 42.

Embodiment 44 is an adhesive composition comprising the polyester of any of embodiments 1 to 31 or the cured polyester of any of embodiments 32 to 41 or the pressure sensitive adhesive of embodiment 42.

Embodiment 45 is the adhesive composition of Embodiment 44, further comprising a tackifier.

Although specific embodiments have been described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A polyester comprising at least one crosslinkable moiety, each crosslinkable moiety including at least one crosslinkable pendent group, wherein a ratio of a total number of the at least one crosslinkable pendent groups to a total number of ester groups in the polyester is in a range of 0.0001 to 0.5, wherein the polyester has a glass transition temperature less than 0° C.

2. The polyester of claim 1, wherein the ratio of the total number of the at least one crosslinkable pendent groups to the total number of ester groups in the polyester is in a range of 0.001 to 0.1.

3. A polyester comprising at least one crosslinkable moiety, each crosslinkable moiety including at least one crosslinkable pendent group, wherein a ratio of a total number of the at least one crosslinkable moiety to a total number of ester groups in the polyester is in a range of 0.0001 to 0.5, wherein the polyester has a glass transition temperature less than 0° C.

4. The polyester of claim 3, wherein the ratio of the total number of the at least one crosslinkable moiety to the total number of ester groups in the polyester is in a range of 0.001 to 0.1.

5. A polyester comprising the reaction product of reactive precursors, the reactive precursors comprising:
at least one diacid or diester;
at least one diol not containing a crosslinkable pendent group; and
at least one monomer containing at least one crosslinkable pendent group;
wherein a ratio of the number of molecules of the at least one monomer to a sum of the number of molecules of the at least one diacid or diester and the number of molecules of the at least one diol is in a range of 0.0001 to 0.5,
wherein the polyester has a glass transition temperature less than 0° C.

6. The polyester of claim 5, wherein the ratio of the number of molecules of the at least one monomer to the sum of the number of molecules of the at least one diacid or diester and the number of molecules of the at least one diol is in a range of 0.001 to 0.1.

7. The polyester of claim 5, wherein a ratio of the number of molecules of the at least one diacid or diester to the number of molecules of the at least one diol is in a range of 0.85 to 1.15.

8. The polyester of claim 5, wherein a ratio of the number of molecules of the at least one diacid or diester to the number of molecules of the at least one diol is in a range of 0.9 and 1.1.

9. The polyester of claim 1, wherein the at least one crosslinkable pendent group comprises a carbon-carbon double bond.

10. The polyester of claim 1, wherein the at least one crosslinkable moiety includes a moiety arising from a reacted diol monomer, a moiety arising from a reacted diacid monomer, a moiety arising from a reacted diester moiety, or a combination thereof.

11. The polyester of claim 5, wherein the at least one monomer containing the crosslinkable pendent group comprises a diol monomer, a diacid monomer, a diester monomer or a combination thereof.

12. The polyester of claim 1, wherein each moiety has the formula:

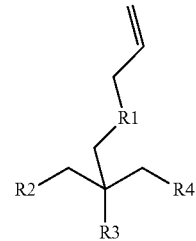

wherein R1 is —O—, —(CH2)n-, —COO—, —OCO—, —OOC—, —S—, or —(C=O)—;

R2 is —OH, —COOH, or R2'-, wherein R2'- is —O—, —COO—, —(CH2)n-, —(C=O)—, or —S—;

R3 is —H, —CH3, —OH, —CH2OH, —(CH2)m-CH3, —SO3Na, or —COONa;

R4 is —O—, —COO—, —(CH2)p-, —(C=O)—, or —S—;

and n, m and p are positive integers.

13. The polyester of claim 12, wherein n, m and p are independently in a range of 1 to 100.

14. The polyester of claim 12, wherein the moiety has the formula:

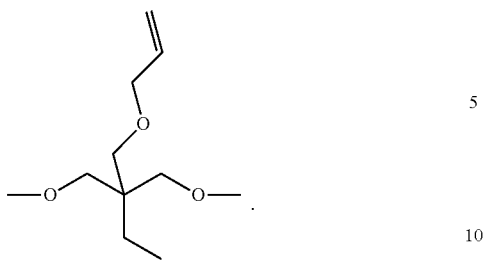

15. An adhesive composition comprising the polyester of claim 1 and further comprising a tackifier.

16. An adhesive comprising a cured polyester, the cured polyester comprising the polyester of claim 1 cured by the application of radiation or heat, the adhesive being a pressure sensitive adhesive.

17. The polyester of claim 1 having a crystallinity corresponding to a differential scanning calorimetry melting endotherm of less than 20 J/g.

18. An adhesive comprising a cured polyester and a tackifier, the cured polyester comprising the polyester of claim 3 cured by the application of radiation or heat, the adhesive being a pressure sensitive adhesive.

19. An adhesive comprising a cured polyester and a tackifier, the cured polyester comprising the polyester of claim 5 cured by the application of radiation or heat, the adhesive being a pressure sensitive adhesive.

20. The polyester of claim 5, wherein the at least one diacid or diester comprises sebacic acid.

* * * * *

UNITED STATES PATENT AND TRADEMARK OFFICE
CERTIFICATE OF CORRECTION

PATENT NO. : 10,752,811 B2
APPLICATION NO. : 15/748219
DATED : August 25, 2020
INVENTOR(S) : Richard Liu Page 1 of 1

It is certified that error appears in the above-identified patent and that said Letters Patent is hereby corrected as shown below:

In the Claims

Column 12
Line 55 (Approx.), In Claim 12, delete "R2'-," and insert -- -R2'-, --, therefor.

Column 12
Line 55 (Approx.), In Claim 12, delete "R2'-" and insert -- -R2'- --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*